United States Patent
Song et al.

(10) Patent No.: US 10,331,979 B2
(45) Date of Patent: Jun. 25, 2019

(54) EXTRACTION AND CLASSIFICATION OF 3-D OBJECTS

(71) Applicant: TeleSecurity Sciences, Inc., Las Vegas, NV (US)

(72) Inventors: Samuel M. Song, Las Vegas, NV (US); Junghyun Kwon, Las Vegas, NV (US); Austin Ely, Las Vegas, NV (US); John Enyeart, Las Vegas, NV (US); Chad Johnson, Las Vegas, NV (US); Jongkyu Lee, Las Vegas, NV (US); Namho Kim, Las Vegas, NV (US); Douglas P. Boyd, Las Vegas, NV (US)

(73) Assignee: TELESECURITY SCIENCES, INC., Las Vegas, NV (US)

(*) Notice: Subject to any disclaimer, the term of this patent is extended or adjusted under 35 U.S.C. 154(b) by 16 days.

(21) Appl. No.: 15/467,937

(22) Filed: Mar. 23, 2017

(65) Prior Publication Data

US 2017/0277978 A1    Sep. 28, 2017

Related U.S. Application Data

(60) Provisional application No. 62/312,963, filed on Mar. 24, 2016.

(51) Int. Cl.
| | |
|---|---|
| *G06K 9/62* | (2006.01) |
| *G06K 9/34* | (2006.01) |
| *G06K 9/52* | (2006.01) |
| *G06K 9/00* | (2006.01) |

(52) U.S. Cl.
CPC ....... *G06K 9/6267* (2013.01); *G06K 9/00214* (2013.01); *G06K 9/34* (2013.01); *G06K 9/52* (2013.01); *G06K 9/6218* (2013.01); *G06K 9/6269* (2013.01); *G06K 2209/09* (2013.01)

(58) Field of Classification Search
CPC .. G06K 9/00; G06K 9/36; G06K 9/46; G06K 9/4671; G06K 9/4676
See application file for complete search history.

(56) References Cited

U.S. PATENT DOCUMENTS

| | | | | | |
|---|---|---|---|---|---|
| 5,796,802 | A * | 8/1998 | Gordon | ............... | G01V 5/005 378/8 |
| 5,974,111 | A * | 10/1999 | Krug | .................. | G01N 23/20 378/53 |
| 6,088,423 | A * | 7/2000 | Krug | .................. | G01V 5/0041 378/4 |
| 6,317,509 | B1 * | 11/2001 | Simanovsky | ......... | G01V 5/005 250/363.04 |
| 7,813,540 | B1 * | 10/2010 | Kraft | .................. | G01V 5/0016 378/57 |

(Continued)

OTHER PUBLICATIONS

Berwick, Robert. "An Idiot's guide to Support vector machines (SVMs)." Retrieved on (Oct. 21, 2003): 2011. (Year: 2011).*

(Continued)

*Primary Examiner* — Bobbak Safaipour
(74) *Attorney, Agent, or Firm* — Procopio, Cory, Hargreaves & Savitch LLP (57) ABSTRACT

Automatic threat detection of volumetric computed tomography (CT) data, including: extracting at least one 3-D object from the volumetric CT data; constructing a feature vector for each of the at least one 3-D objects; and classifying each 3-D object as one of a threat or benign object using the feature vector and a set of truth threat and benign objects.

18 Claims, 7 Drawing Sheets

(56) References Cited

U.S. PATENT DOCUMENTS

| | | | | |
|---|---|---|---|---|
| 8,233,586 B1* | 7/2012 | Boas | .................. | G06T 5/002 378/207 |
| 9,029,778 B1* | 5/2015 | Boyd | .................. | G01J 3/42 250/341.1 |
| 9,123,119 B2* | 9/2015 | Kwon | .................. | G06T 7/155 |
| 2005/0276443 A1* | 12/2005 | Slamani | .................. | G06K 9/00208 382/103 |
| 2006/0274916 A1* | 12/2006 | Chan | .................. | G06Q 10/06 382/100 |
| 2007/0286460 A1* | 12/2007 | Tu | .................. | G06K 9/00771 382/103 |
| 2008/0159605 A1* | 7/2008 | Ramsay | .................. | G06K 9/00 382/128 |
| 2009/0010521 A1* | 1/2009 | Ramsay | .................. | G06K 9/3241 382/141 |
| 2009/0034790 A1* | 2/2009 | Song | .................. | G06T 7/0002 382/103 |
| 2009/0175526 A1* | 7/2009 | Ramsay | .................. | G06K 9/6224 382/132 |
| 2009/0226060 A1* | 9/2009 | Gering | .................. | G06T 7/11 382/128 |
| 2010/0046704 A1* | 2/2010 | Song | .................. | G01N 23/04 378/57 |
| 2010/0239182 A1* | 9/2010 | Basu | .................. | G01V 5/0008 382/282 |
| 2010/0266179 A1* | 10/2010 | Ramsay | .................. | G06T 7/0012 382/131 |
| 2010/0295689 A1* | 11/2010 | Armistead, Jr. | .................. | G06K 9/00 340/600 |
| 2011/0206240 A1* | 8/2011 | Hong | .................. | G06K 9/00771 382/103 |
| 2012/0045127 A1* | 2/2012 | Song | .................. | G01V 5/0016 382/171 |
| 2012/0069963 A1* | 3/2012 | Song | .................. | G01V 5/0025 378/87 |
| 2012/0229631 A1* | 9/2012 | Song | .................. | H04N 7/18 348/143 |
| 2013/0151543 A1* | 6/2013 | Fan | .................. | G06F 16/285 707/758 |
| 2013/0170723 A1* | 7/2013 | Kwon | .................. | G06T 7/155 382/131 |
| 2014/0211988 A1* | 7/2014 | Fan | .................. | G06K 9/3241 382/103 |
| 2016/0335524 A1* | 11/2016 | Bremer | .................. | G06T 7/10 |
| 2017/0316079 A1* | 11/2017 | Lu | .................. | G06F 16/285 |

OTHER PUBLICATIONS

Mitchell, Tom M. "Machine Learning 10-701" Machine Learning Department, Carnegie Mellon University. Apr. 12, 2011 (Year: 2011).*

* cited by examiner

EXTRACTION AND CLASSIFICATION OF 3-D OBJECTS

CROSS-REFERENCE TO RELATED APPLICATIONS

This application claims the benefit of priority under 35 U.S.C. § 119(e) of U.S. Provisional Patent Application No. 62/312,963, filed Mar. 24, 2016, entitled "EXTRACTION OF CLASSIFICATION OF 3-D OBJECTS FROM VOLUMETRIC CT DATA." The disclosure of the above-referenced application is incorporated herein by reference.

BACKGROUND

Field of the Disclosure

The present disclosure relates to extraction and classification of 3-D objects, and more specifically, to extraction and classification of 3-D objects from volumetric data.

Background

The goal of X-ray imaging-based threat detection system, is to render succinct images of explosives so that upon close scrutiny, either by a human operator or by using some automatic threat detection techniques, the threat(s) can be recognized and detected. A computed tomography (CT) scan, which uses computer-processed combinations of many X-ray images taken from different angles to produce cross-sectional images of specific areas of a scanned object, is often used to see inside the object without cutting. Although existing X-ray imaging-based threat detection techniques perform reasonably well in recognizing explosives, human intervention may still be required for the final decision whether to accept or reject the scanned bag. Extensive human intervention may significantly increase the cost of security systems involving X-ray imaging techniques.

SUMMARY

The present disclosure provides for providing automatic threat detection of volumetric computed tomography (CT) data.

In one implementation, a method for automatic threat detection of volumetric CT data is disclosed. The method includes: extracting at least one 3-D object from the volumetric CT data; constructing a feature vector for each of the at least one 3-D objects; and classifying each 3-D object as one of a threat or benign object using the feature vector and a set of truth threat and benign objects In smother implementation, a system for automatic threat detection of volumetric computed tomography (CT) data is disclosed. The system, includes: a 3-D extraction unit configured to extract at least one 3-D object from the volumetric CT data and to construct a feature vector for each of the at least one 3-D objects; and a classification unit configured to classify each 3-D object as one of a threat or benign object using the feature vector and a set of truth threat and benign objects.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, existing X-ray imaging-based threat detection techniques perform reasonably well in recognizing explosives. However, human intervention may still be required for the final decision whether to accept or reject the scanned bag, which may significantly increase the cost of security systems involving X-ray imaging techniques.

Certain implementations of the present disclosure provide an alternative solution which significantly reduces the need for human intervention. After reading these descriptions, it will become apparent how to implement the disclosure in various implementations and applications. However, although various implementations of the present disclosure will be described herein, it is understood that these implementations are presented by way of example only, and not limitation. As such, this detailed description of various implementations should not be construed to limit the scope or breadth of the present disclosure.

Figure 1:
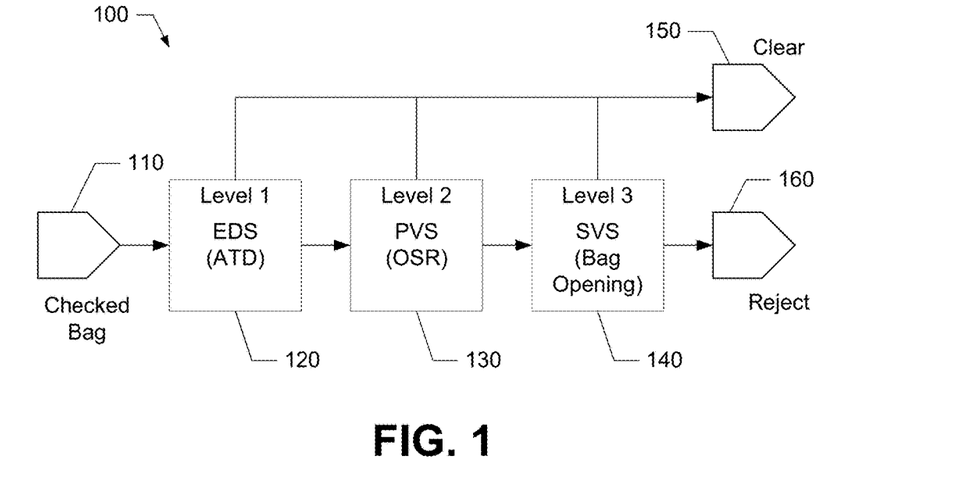
FIG. 1 is a block diagram of an inspection chain of a checked baggage that includes Level 1 through Level 3 inspection processes.

FIG. 1 is a block diagram of an inspection chain 100 of a checked baggage 110 that includes Level 1 through Level 3 inspection processes. In the illustrated implementation of FIG. 1, the in-line checked baggage inspection chain 100 includes an explosive detection system (EDS) 120 along with a resident automatic threat detection (ATD), a primary viewing station (PVS) 130, and a secondary viewing station (SVS) 140. As the checked bag 110 moves through the chain 100, the bag 110 can be cleared 150 at any level of inspection 120, 130, 140 or be rejected after moving through all levels of inspection. As the checked baggage inspection chain continues to evolve, improvements in ATD performance will play a significant role to enhance security while lowering the life-cycle cost as the ATD is a software component that can easily be upgraded to all deployed systems without any other hardware upgrades.

The ATD techniques that can achieve higher probability of detection (PD) with lower probability of false alarm (PEA) promise to yield significant benefits in the form of reduced cost of ownership while enhancing security. A slight reduction in PEA, would immediately lower the cost of operation as millions of checked bags are inspected in US airports every day. Currently, secondary (Level 2) and tertiary (Level 3) screening methods require a large number of trained personnel to be active at all times. This manpower requirement adds significant operational cost which can be reduced through the application of advanced ATD techniques that can reliably clear a larger proportion of the baggage.

In one implementation, the alternative solution includes an ATD technique for EDS using multi-stage Segmentation and Carving (SC) followed by Support Vector Machine (SVM) classifier. The multi-stage Segmentation and Carving (SC) step extracts all 3-D objects. The feature vectors are then constructed for all extracted objects and classified by the SVM using a set of ground truth threat and benign objects. The learned SVM classifier has shown to be effective in classification of different types of threat materials.

The ATD technique described in the present disclosure robustly deals with CT data that are prone to artifacts due to scatter, beam hardening, and other systematic idiosyncrasies of the CT data. Furthermore, the described ATD technique is amenable for including newly emerging threat materials as well as for accommodating data from newly developing sensor technologies.

Figure 2:
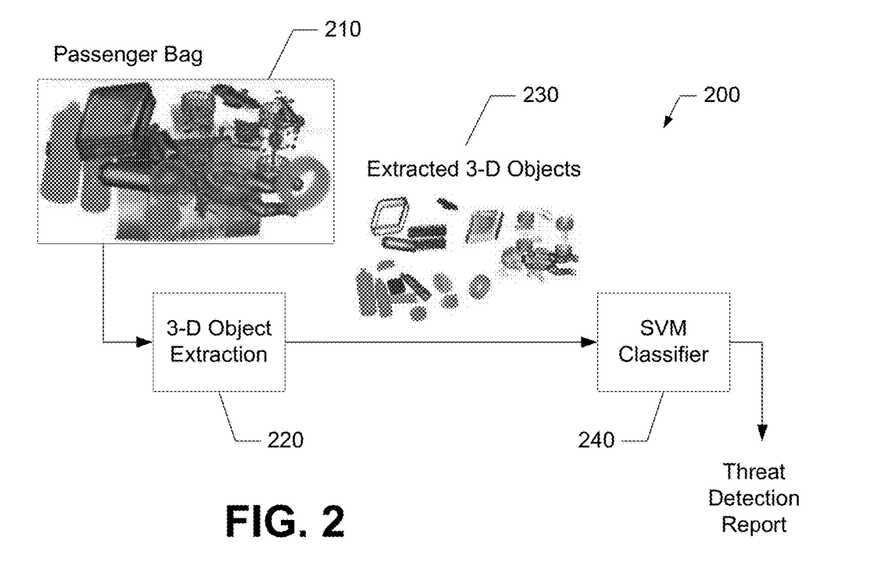
FIG. 2 is a block diagram of an ATD processing system in accordance with one implementation of the present disclosure.

FIG. 2 is a block diagram of an ATD processing system 200 in accordance with one implementation of the present disclosure. In the illustrated implementation of FIG. 2, the passenger bag 210 is first processed by a 3-D object extraction unit 220 to extract all 3-D objects. The extracted 3-D objects 230 are then classified (e.g., by an SVM classifier 240) as a threat (explosive) or benign. The two components of the ATD processing 200, which include the 3-D extraction unit 220 and an SVM classifier 240, are described below in detail.

In one implementation, the 3-D object extraction unit 220 including a 3-D object extraction technique includes three processing stages: preprocessing of the volumetric CT data, extraction of objects by sequential application of Segmentation and Carving (SC) (i.e., a multi-stage SC), and post-processing of extracted 3-D objects. At the pre-processing stage which may include a training stage, the edge-preserving bilateral filter compensates for CT artifacts. Further, parameters for the multi-stage SC are determined during the training stage. The multi-stage SC step then extracts 3-D objects where different stages extract different types of 3-D objects depending on the parameters determined in the training stage. In one implementation, the SC step labels 3-D objects with a connected component labeling (CCL) processing using the symmetric region growing (SRG) with connectivity strength. The post-processing stage splits objects that are merged, and merges objects that are split.

The CT images usually suffer from different types of artifacts such as streaking, shading, and beam hardening (cupping). Effects of these artifacts are even more prevalent in CT images of the checked baggage due to the abundance of metallic objects. Metal streaking artifacts, for example, often result in over-segmentation, where a single object is split into many small regions. Beam hardening and shading artifacts often lead to 3-D objects that are smaller than the ground truth.

In one implementation, the bilateral filtering is applied as preprocessing to reduce the CT artifacts. The bilateral filter performs image smoothing while preserving sharp edges. The bilateral filter output at a pixel is the weighted sum of the neighboring pixels, where the weights are determined by the differences in the spatial position and image values. The filtered image g(p) can be expressed as:

$$g(p)=A\int_q (f(q)h_d(p-q)h_r(f(p)-f(q))dq, \quad (1)$$

where f(p) is the input image, the filter kernels $h_d(\cdot)$ and $h_r(\cdot)$ are typically Gaussian (i.e., centered at zero with spreads $\sigma_d$ and $\sigma_r$), and A is a normalization factor so that the sum of the filter weights is unity. Thus, Eq. (1) implies that pixels similar in both domain (position) and range (image intensity) are multiplied with larger weights to allow edge-preserving smoothing.

In one implementation, the multi-stage SC step is a multiple application of a modified CCL followed by carving out of the connected components. In one implementation, the CCL uses the SRG where no seeds are placed. The SRG grows regions using the symmetric region growing function, srg(p,q), shown in Eq. (2), where $$srg(p,q)=\text{TRUE} \rightarrow p \text{ and } q \text{ belongs to the same region} \quad (2)$$

The present implementation uses a modified symmetric region growing function (shown as Eq. (3)):

$$srg(p,q)=|g(p)-g(q)|\leq c(p,q) \quad (3)$$

where c is the connectivity strength, which may vary spatially. The SRG implementation is invariant to voxel processing order. In Eq. (3), different c may result in different extracted 3-D objects. Larger c usually results in under-segmentation (different objects lumped as a single object) and smaller c results in over-segmentation (a single region segmented in many pieces). Thus, by selectively processing voxels within a window of Hounsfield Units (HU), $I_1 \leq g(p) \leq I_2$, different objects with different c can be extracted. Defining Segmentation and Carving function $SC(I_1, I_2, c)$ allows the explanation of the multi-stage SC as follows:

For k=1, . . . , K
  Set $I_1$, $I_2$, and c for stage k
  Perform $SC(I_1, I_2, c)$
    Threshold the image g(p) with $I_1 \leq g(p) \leq I_2$
    Perform SRG with Eq. (3) for the binary mask obtained in the previous step
    Carve out all segmented objects from the bag for the next SC step.
    Perform stage dependent morphological processing
  Next k At the completion of K stages, the 3-D objects are extracted from the K stages above.

The multi-stage SC step above typically includes cases where different objects that are merged together and homogeneous objects that have been split. Thus, the post processing of the extracted 3-D objects is performed subsequent to the multi-stage SC step. In one implementation, the extracted 3-D objects are refined by first splitting merged objects and then merging split objects. However, prior to the actual splitting and merging, the dimensionality of the 3-D object representation is reduced by several orders of magnitude by simple linear clustering (SLIC) representation.

In one implementation, following are implemented for splitting: (1) the spectral clustering with the construction of the Laplacian matrix, L; and (2) clustering of the 3-D objects by clustering rows of eigenvectors corresponding to the k smallest eigenvalues of L by k-means clustering. The decision to split has been determined by the CT histogram, of the extracted 3-D object. If the histogram is sufficiently "multi-modal" the splitting technique (i.e., spectral clustering) is invoked as multi-modal CT histogram, is indicative of the 3-D object as two (or more) objects merged together. The split objects are then merged based on a set of heuristics including spatial proximity, mean HU, and the particular SC stage at which the objects were extracted. Objects selected based on these heuristics are merged as a single 3-D object.

Regarding the SVM classifier, for a two class classification problem with non-separable samples, the SVM offers a solution that, maximizes the margin between the two classes. The optimization problem to be solved includes:

$$\operatorname{argmin}_{w,b}\left\{\frac{1}{2}\|w\|^2 + C\sum_{n=1}^{N}\xi_n\right\}, \quad (4)$$

where $\|w\|^{-1}$ is the margin, b is the "bias" term to be determined (see Eq. (7)), and C is the relative weight placed on the penalty term composed of the slack variables $\xi_n \leq 0$.

However, in many cases, and in particular for ATD for passenger bags, there are many more benign samples (bags) than threat samples (bags) for learning. Therefore, to equalize the relative importance of all samples, denote the two sets of classes as {+} and {−} composed of $N^+$ and $N^-$ samples respectively, and solve the following optimization problem instead:

$$\operatorname{argmin}_{w,b}\left\{\frac{1}{2}\|w\|^2 + C^+\sum_{n\in\{+\}}\xi_n + C^-\sum_{n\in\{-\}}\xi_n\right\} \quad (5)$$

The penalty weights $C^+$ and $C^-$ are adjusted so that errors that occur in the two classes are weighted equally independent of the particular class. The Karush-Kuhn-Tucker condition provides the following solution:

$$y(x) = \sum_{n\in S} a_n t_n k(x, x_n) + b \quad (6)$$

$$b = \frac{1}{N_S}\sum_{n\in S}\left(t_n - \sum_{m\in S} a_m t_m k(x_n, x_m)\right) \quad (7)$$

where $t_n \in \{+1, -1\}$ is the class label, S denotes the set of $N_S$ support vectors ($x_n$), $a_n$ are the corresponding Lagrange multipliers for the $n^{th}$ support vector $x_n$, and k(•, •) is the kernel. The support vectors and the Lagrange multipliers are obtained as the solution of Eq, (5) through quadratic programming.

Finally, the classification of the unknown vector x is the following:

$$y(x) > 0 \rightarrow \text{class 1}$$

$$y(x) \leq 0 \rightarrow \text{class-1} \quad (8)$$

Figure 3:
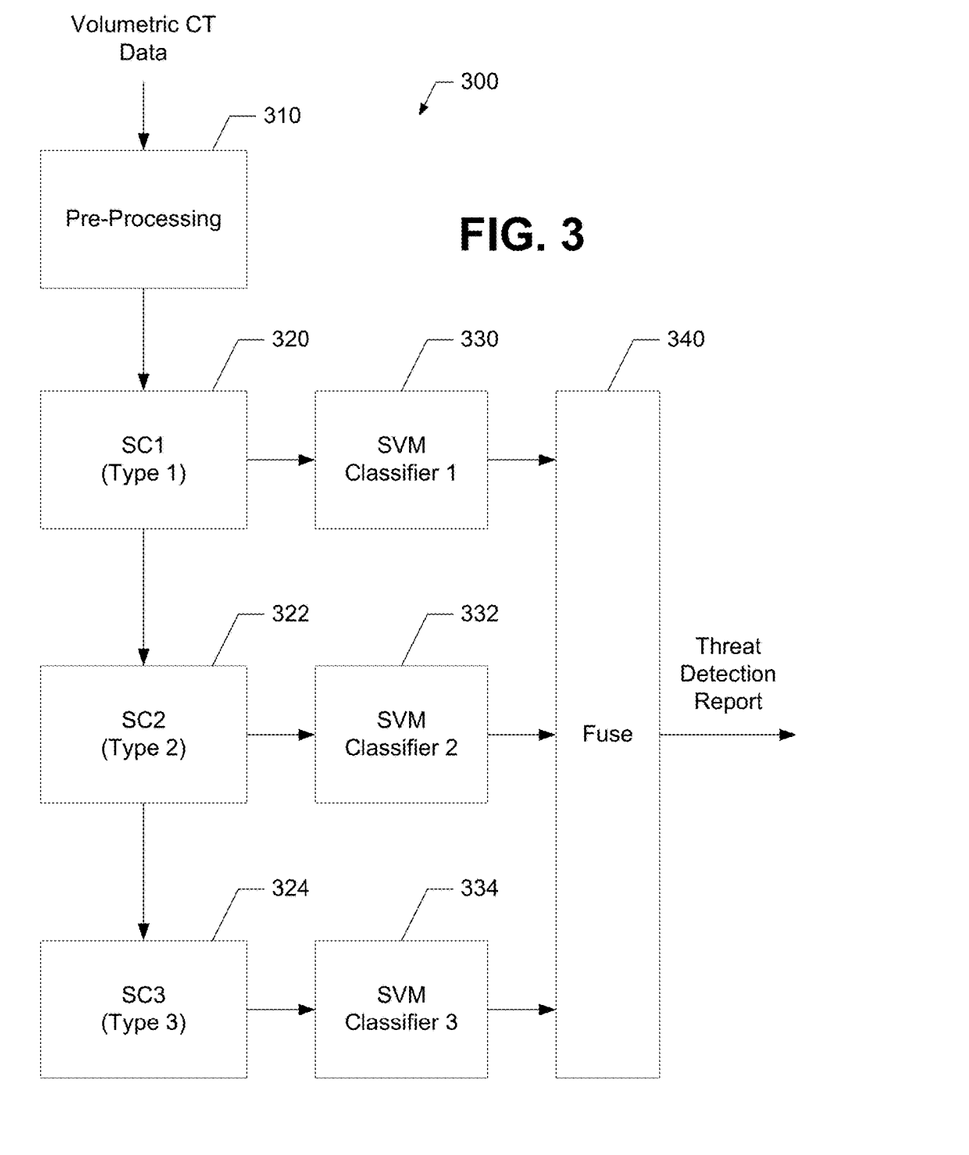
FIG. 3 is a block diagram of an ATD system in accordance with another embodiment of the present disclosure.

FIG. 3 is a block diagram of an ATD system 300 in accordance with another embodiment of the present disclosure. In the illustrated embodiment of FIG. 3, the ATD processing 300 includes a pre-processing unit 310, interconnected multi-stage SC units 320, 322, 324, SVM classifier components 330, 332, 334, and a combiner 340.

In the illustrated embodiment of FIG. 3, the pre-processing unit 310 processes the volumetric CT data of the passenger bag using an edge-preserving bilateral filter to mitigate various CT artifacts. The multi-stage SC units 320, 322, 324 (e.g., 3 stages in FIG. 3) extract three different types of 3-D objects (Type 1 through Type 3). The features of the extracted 3-D objects are then processed by different SVM classifier components 330, 332, 334 corresponding to the appropriate threat type for the final decision. The outputs of all SVM classifier components 320, 322, 324 are combined by the combiner 340 to generate the final Threat Detection Report. Although there may be a fusion approach that may further enhance performance, one fusion operation that can be used is the simple Boolean "or". In one implementation, the three types of threat suspects as extracted by SC units 320, 322, 324 are 3-D objects that do not overlap.

In one implementation, the feature vector $x=[x_s^T, x_v^T]^T$ that includes four scalar features ($x_s$) and one vector feature ($x_v$). More specifically, the feature vector includes:

Scalar features ($x_s$): 1st and 2nd moment of CT number, sphericity and mean atomic number $Z_{eff}$ (for dual energy CT scanner). All scalar features are normalized.

Vector feature ($x_v$): histogram, of CT numbers.

The kernel function used is a weighted sum of the Gaussian radial basis function and the histogram, intersection kernel as follows:

$$k(x,x') = \exp(-\|x_s - x_s'\|^2/2\sigma^2) + W_{CTH}\Sigma_i \min(x_v(i), x_v'(i)) \quad (9)$$

where $x=[x_s^T, x_v^T]^T$, $x_v(i)$ is the histogram bin count of the $i^{th}$ bin and $W_{CTH} \geq 0$ is the relative weight for the histogram intersection kernel. In one implementation, the identical SVM model is used for all three SVM classifier units 330, 332, 334. It should be noted that the three SVM classifier units 330, 332, 334 include different support vectors and corresponding Lagrange multipliers as they are learned with different training samples. It should also be noted that the above kernel function is at least positive-semidefinite as both terms are at least positive-semidefinite.

Figure 4A:
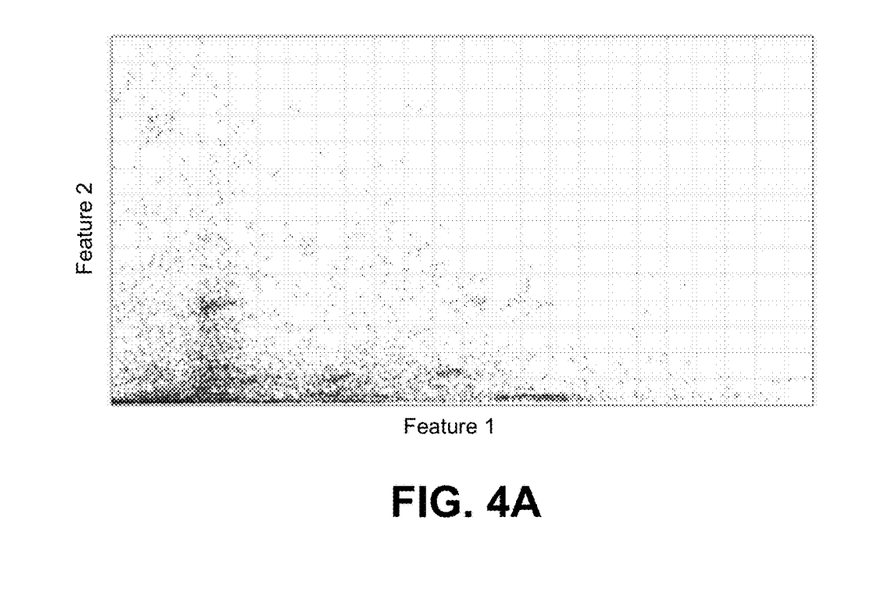
FIG. 4A is a scatter plot of 2-D features of extracted 3-D objects showing features from benign objects.
Figure 4B:
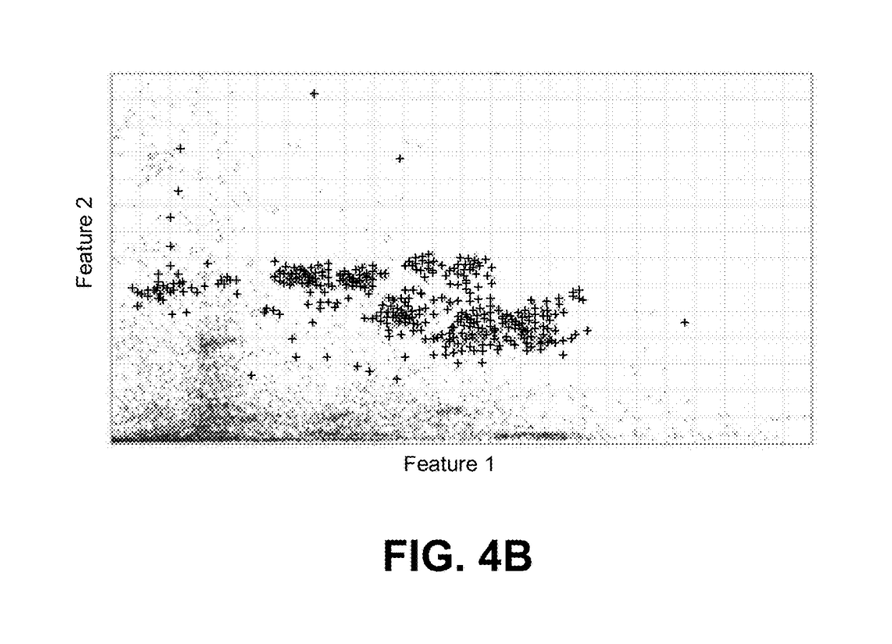
FIG. 4B is a scatter plot of 2-D features of extracted 3-D objects showing six different threat materials overlaid on top of the scatter plot of FIG. 4A.

FIG. 4A is a scatter plot of 2-D features of extracted 3-D objects showing features (x-axis: feature 1; y-axis: feature 2) from benign objects. FIG. 4B is a scatter plot of 2-D features (x-axis: feature 1; y-axis: feature 2) of extracted 3-D objects showing several different threat materials (marked with '+') overlaid on top of the scatter plot of FIG. 4A. These threat materials belong to one of the three previously-mentioned threat types (corresponding to the three SVMs). Any decision boundary based on these two features may produce false alarms that may be prohibitive. The extracted 3-D objects from, typical 3-D bags can number up to thirty or forty objects. If any one of these benign objects includes features that are near the threat features, the benign object will be declared as a threat item. The above-described ATD based on the SVM classifier mitigates this situation by constructing a high dimensional feature vector described above.

Figure 5A:
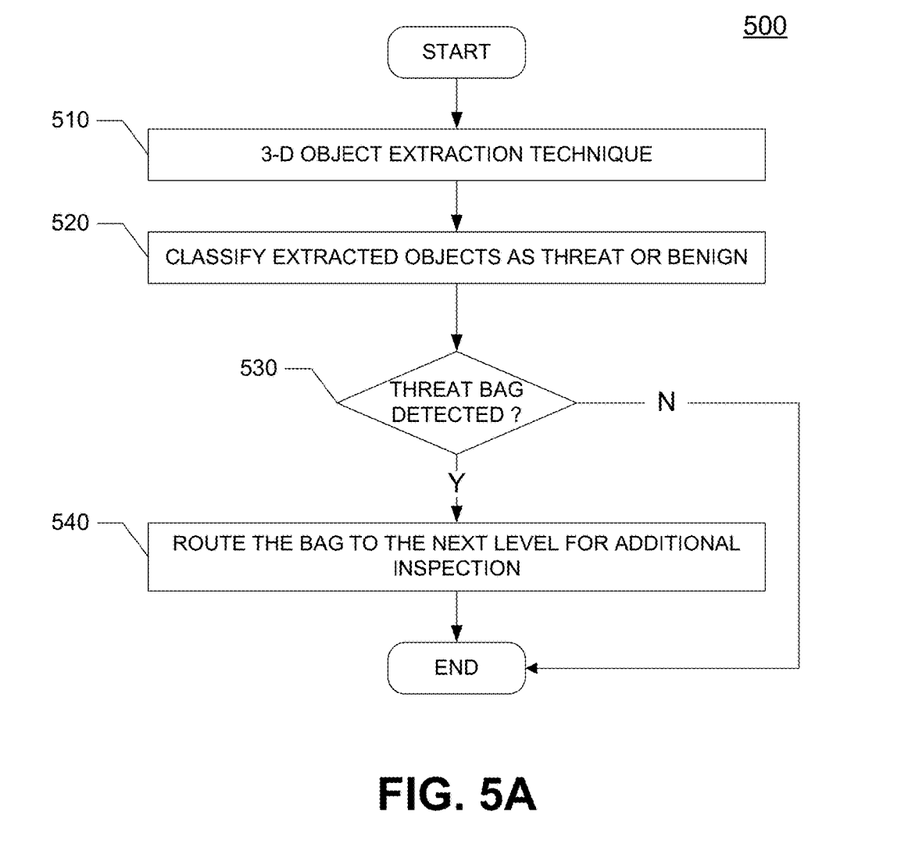
FIG. 5A is a flow diagram of the ATD processing in accordance with one implementation of the present disclosure.

FIG. 5A is a flow diagram of the ATD processing 500 in accordance with one implementation of the present disclosure. In the illustrated implementation of FIG. 5, the passenger bag is processed, at block 510, using a 3-D object extraction technique to extract all 3-D objects. The extracted 3-D objects are then classified, at block 520, as threat (explosive) or benign. In one implementation, the classification process includes constructing feature vectors for all extracted objects and classifying the extracted object by the SVM using the feature vectors and a set of ground truth threat and benign objects. If a threat material is found in the bag, at block 530, the bag is then routed to the next level for additional inspection(s), at block 540.

Figure 5B:
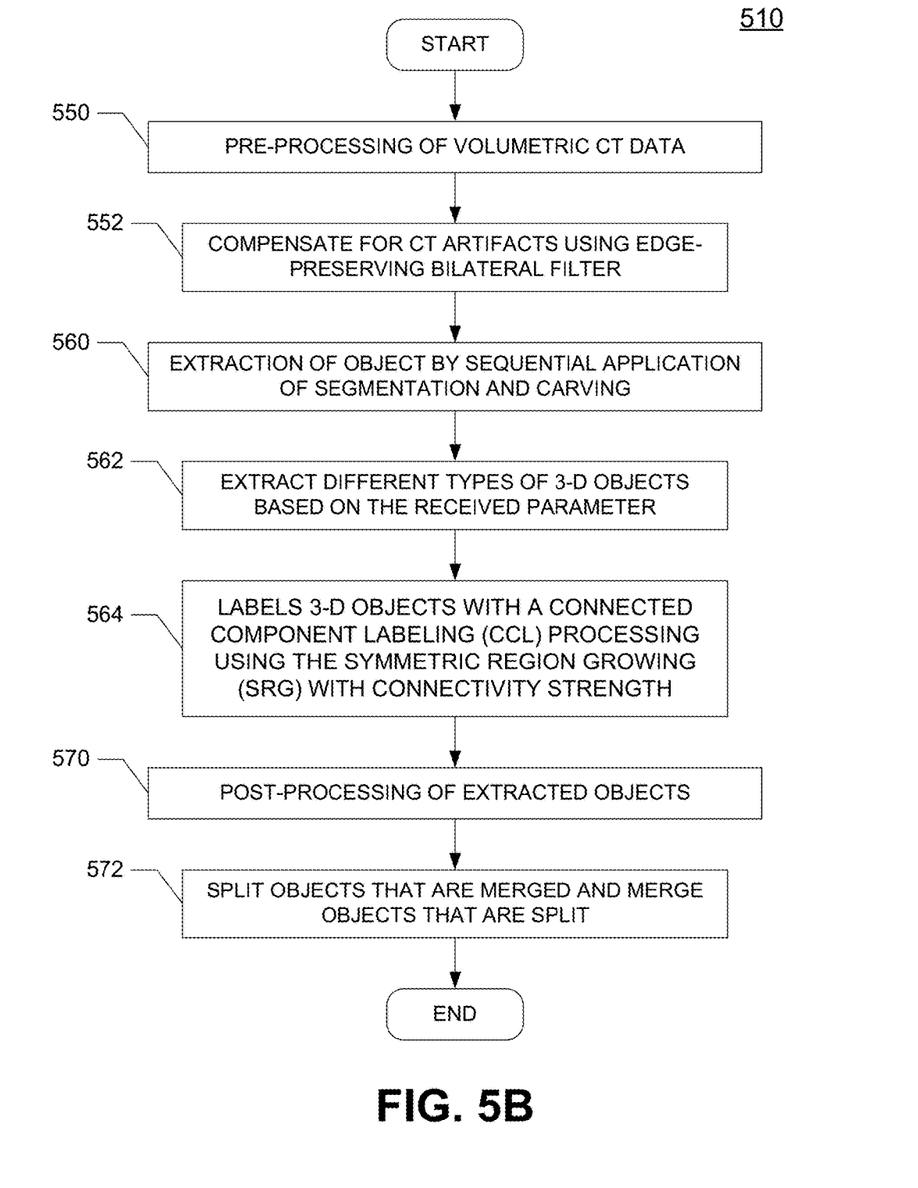
FIG. 5B is a detailed flow diagram of the 3-D object extraction technique performed at block in accordance with one implementation of the present disclosure.

FIG. 5B is a detailed flow diagram, of the 3-D object, extraction technique performed at block 510 in accordance with one implementation of the present disclosure. The technique 510 includes three processing stages: preprocessing of the volumetric CT data, at block 550, extraction of objects by sequential application of Segmentation and Carving (SC) on the volumetric CT data to produce segmented data, at block 560, and post-processing of the segmented data of the extracted 3-D objects, at block 570.

In one implementation, at block 552 of the pre-processing stage (block 550), the edge-preserving bilateral filter is used to compensate for CT artifacts. At block 562 of the multi-stage SC step (block 560), different types of the 3-D objects are extracted depending on the parameters passed to the SC step from the pre-processing. At block 564, the SC step also labels 3-D objects with a Connected Component Labeling (CCL) processing using the Symmetric Region Growing (SRG) with connectivity strength. At block 572, the post-processing stage splits objects that are merged, and merges objects that are split.

The efficacy and advantages of the above-described ATD techniques with the SVM classifier are demonstrated by the receiver operating characteristics (ROC) curve that relates the PD as a function of the PFA. The tests performed using CT data of the baggage show excellent performance characteristics. In generating the ROC curves, following parameters are needed to be established:

$\sigma^2$ of the Gaussian radial basis function
$W_{CTH}$—relative weight for the histogram, intersection kernel;
C—penalty weight (to determine $C^+$ and $C^-$ of Eq. (5))

All parameters above were optimized manually by first searching through the space of coarse grid in the 3-D search space. Then, it was further refined by varying one in a finer grid with two others fixed. The refinement was iterated until numerical convergence. Once this search process has been completed, $C^+$ and $C^-$ are set as follows:

$$C^+ = \alpha C\, N^-/(N^+ + N^-) \text{ and } C^- = (1-\alpha) C\, N^+/(N^+ + N^-). \quad (10)$$

where $N^+$ and $N^-$ are the number of training samples in class "1" and "−1", respectively. Note that $N^+$ and $N^-$ corrects for the imbalanced number of samples by placing the relative importance of all training samples equally. Once parameters of the SVM, namely, ($\sigma^2$, $W_{CTH}$, C), have been optimized, sweeping α from 0 to 1 traces the ROC curve.

For ATD evaluation, the CT data (e.g., several hundred or more benign and threat bags) and the ground truth masks for the threats are semi-automatically generated to be used for scoring. The ATD is also tuned by optimizing the parameters within the 3-D object extraction and the SVM classifier. Then, the ATD evaluation is performed and the overall ROC curves is generated. Further, individual ROC curves, for different SVMs for the three different types of threats, are also generated.

For ATD scoring and estimation of PD and PFA, a threat present in a bag is defined to be correctly detected if the declared threat region overlaps the ground truth by at least 50% and does not bleed-out by more than 50% of the declared mask. Therefore, in order to be counted as a correct detection, the declared threat must satisfy the following:

$$\text{Overlap} = \frac{\sum_i Vol(G \cap T_i)}{Vol(G)} \geq 0.5 \quad (11)$$

$$\text{Bleed-out} = \left(1 - \frac{\sum_i Vol(G \cap T_i)}{\sum_i Vol(T_i)}\right) \leq 0.5 \quad (12)$$

where G is the ground truth mask for the threat region, $T_i$ is the $i^{th}$ declared threat, and Vol(•) is the volume operator (i.e., the number of voxels contained in the argument).

When all parameters driving the ATD are fixed, the ATD has an intrinsic operating point, namely the PD and the PFA. The values of PD and PFA are estimated with the sample data set. Thus, PD and PFA are estimated as:

$$\widehat{PD} = \frac{\text{\# of correctly detected threat bags}}{\text{\# of threat bags}} \quad (13)$$

$$\widehat{PFA} = \frac{\text{\# of alarmed benign bags}}{\text{\# of benign bags}} \quad (14)$$

The plot of $\widehat{PD}$ vs $\widehat{PFA}$ provides the estimate of the ROC curve. Note that false positives declared in threat bags are not counted.

Figure 6A:
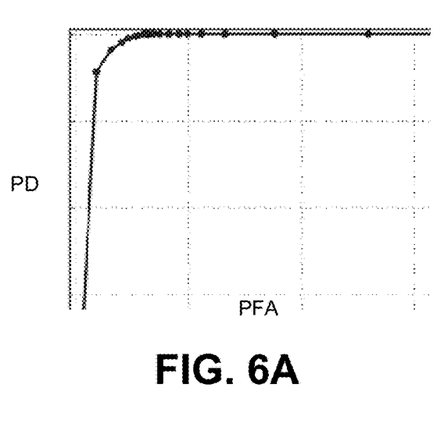
FIGS. 6A through 6D are four ROC curves (PD vs. PFA) of estimates for the ATD performance.
Figure 6B:
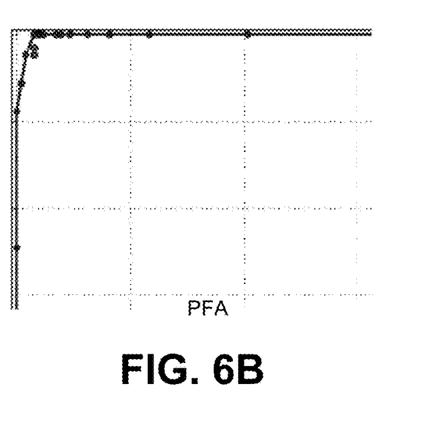
Figure 6C:
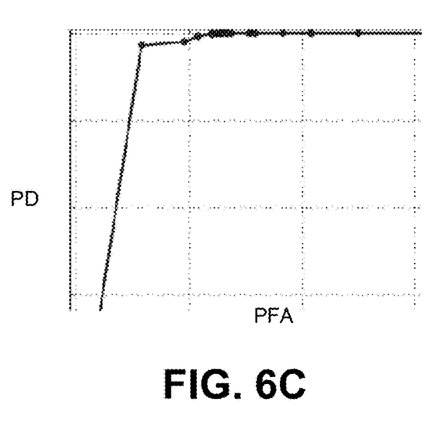
Figure 6D:
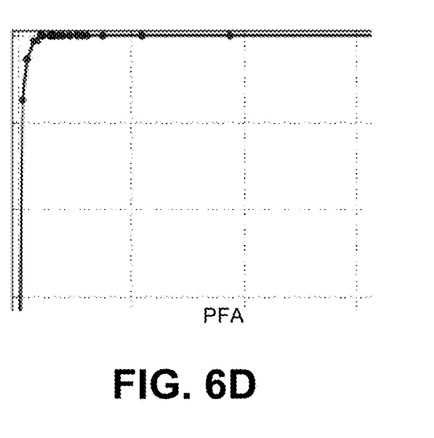

FIGS. 6A through 6D are four ROC curves (PD vs. PFA) of estimates for the ATD performance. FIG. 6A is the overall ROC curve, while FIGS. 6B to 6D are individual ROC curves for three different threat types. The relative frequency or the prior probability for occurrence of the three threat types is approximately equally likely. The ROC curves obtained during the k-fold (with k=4) cross-validation runs show similar ROC curves to those shown in FIGS. 6A through 6D. Although the ROC curves show in FIGS. 6A to 6D provide the visualization of the expected performance, scatter plot of the decision function (see Eq. (6)) as a function of mean CT number will show additional insight as to the distribution of the support vectors relative to other samples.

Figure 7:
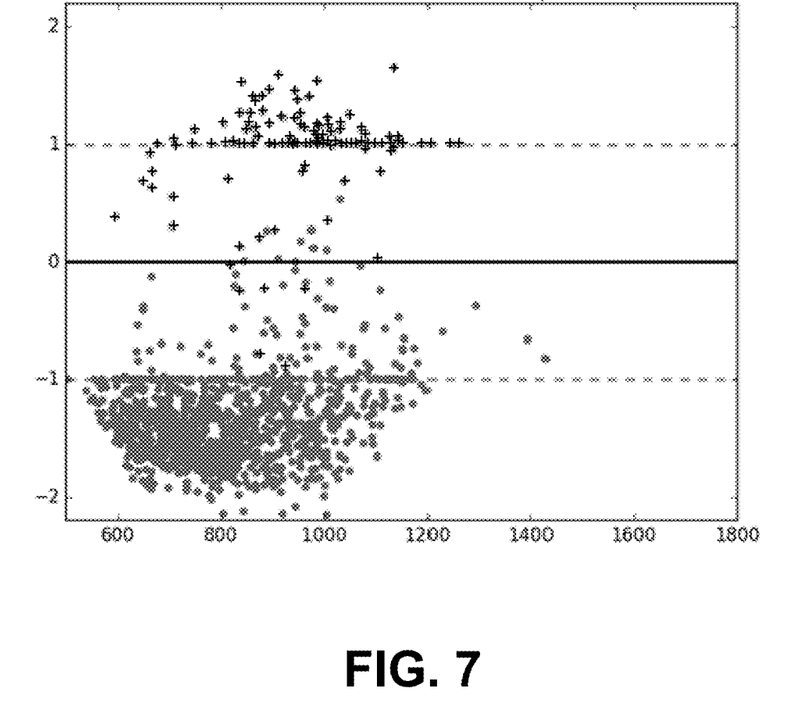
FIG. 7 is a plot of the decision function for both the benign (class −1; labeled as 'o') and the threat (class +1; labeled as '+') samples for a particular threat type.

FIG. 7 is a plot of the decision function for both the benign (class −1; labeled as 'o') and the threat (class +1; labeled as '+') samples for a particular threat type. The points that lie on the horizontal line −1 and +1 are the support vectors for benign and threat samples, respectively. Notice that there are many more points than the number of support vectors. The support vectors can be regarded as "representative vectors" of the respective class for the benign (o) and threat (+) samples. Since the majority (75% or more) of the samples does not play a role in the SVM classifier, it is safe to state that the proposed SVM classifier is not "memorizing" the training samples. Moreover, as samples of two classes are sufficiently separated with minimal erroneous classification (the samples that lie on different sides of y=0), the proposed ATD appears to be robust and the proposed ATD for the volumetric CT baggage scanner based on 3-D object extraction followed by SVM classifier shows excellent performance for three different data.

The above description of the disclosed implementations is provided to enable any person skilled in the art to make or use the disclosure. One implementation includes one or more programmable processors and corresponding computer system components to store and execute computer instructions, such as to perform ATD processing.

Various modifications to these implementations will be readily apparent to those skilled in the art, and the generic principles described herein can be applied to other implementations without departing from the spirit or scope of the disclosure. Accordingly, the techniques are not limited to the specific examples described above. Thus, it is to be understood that the description and drawings presented herein represent a presently possible implementation of the disclosure and are therefore representative of the subject matter that is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for automatic threat detection of volumetric computed tomography (CT) data of a scanned bag received from a CT scanner, the method comprising:
   extracting, by one or more processors, at least one 3-D object from the volumetric CT data received from the CT scanner via multi-stage segmentation and carving (SC), the at least one 3-D object representing a corresponding at least one object in the scanned bag;
   constructing, by the one or more processors, a feature vector for the at least one 3-D object, the feature vector including four scalar features and one vector feature;
   comparing, by the one or more processors, the feature vector to a set of ground truth threat and benign object types;
   classifying, by the one or more processors, the at least one 3-D object as one of a threat object and a benign object based on the comparing.

2. The method of claim 1, wherein the volumetric CT data is obtained from a CT scan of the baggage.

3. The method of claim 1, wherein extracting at least one 3-D object comprises:
   pre-processing the volumetric CT data;
   sequentially applying a segmentation and carving technique on the pre-processed data to generate segmented data; and
   post-processing the segmented data.

4. The method of claim 3, wherein pre-processing comprises
   compensating for artifacts in the volumetric CT data using an edge-preserving bilateral filter or a Total Variation minimization filter.

5. The method of claim 3, wherein the segmentation and carving technique comprises
   labelling the at least one 3-D object with a connected component labeling (CCL) processing using the symmetric region growing (SRG) with connectivity strength that varies across the volume.

6. The method of claim 3, wherein the post-processing comprises:
   splitting merged 3-D objects; and
   merging split 3-D objects.

7. The method of claim 3, wherein the post-processing comprises:
   reducing a dimensionality of the at least one 3-D object using simple linear clustering; and
   splitting merged 3-D objects and merging split 3-D objects.

8. The method of claim 7, wherein splitting the merged 3-D objects comprises:
   spectral clustering with a construction of a Laplacian matrix; and
   clustering rows of eigenvectors corresponding to k smallest eigenvalues of the Laplacian matrix by k-means clustering.

9. The method of claim 7, wherein merging the split 3-D objects is based on a set of heuristics including spatial proximity and mean Hounsfield Units (HU).

10. The method of claim 3, wherein the segmentation and carving technique comprises
    multiple stages of segmentation and carving steps, wherein each stage extracts different type of the at least one 3-D object.

11. The method of claim 1, further comprising combining outputs of the at least one SVM component to produce a threat detection report.

12. A system for automatic threat detection of volumetric computed tomography (CT) data of a scanned bag received from a CT scanner, the system comprising:
    a 3-D extraction unit configured to extract at least one 3-D object from the volumetric CT data received from the CT scanner via multi-stage segmentation and carving (SC), the at least one 3-D object representing a corresponding at least one object in the scanned bag, and to construct a feature vector for each of the at least one 3-D object, the feature vector including four scalar features and one vector feature; and
    a classification unit configured to classify each 3-D object as one of a threat object and a benign object using at least one support vector machine (SVM) component based on the feature vector and a set of ground truth threat and benign object types,
    wherein classifying using the at least one SVM component includes maximizing a margin between the threat object type and the benign object type.

13. The system of claim 12, wherein the volumetric CT data includes CT scanned data of the baggage.

14. The system of claim 12, wherein the 3-D extraction unit comprises:
    a pre-processing unit configured to pre-process the volumetric CT data;
    a segmentation and carving (SC) unit configured to sequentially apply a segmentation and carving technique on the pre-processed data to generate segmented data; and
    a post-processing unit configured to post-process the segmented data.

15. The system of claim 14, wherein the pre-processing unit comprises
    an edge-preserving bilateral filter or a Total Variation minimization filter configured to compensate for artifacts in the volumetric CT data.

16. The system of claim 14, wherein the SC unit comprises
    a plurality of SC stages, wherein each stage extracts different type of the at least one 3-D object.

17. The system of claim 12, wherein a different SVM component of the at least one SVM component is used to classify a different type of the at least one 3-D object.

18. The system of claim 12, further comprising
    a combining unit configured to combine outputs of the at least one SVM component to produce a threat detection report.

* * * * *